US006466927B1

(12) United States Patent
Dougherty et al.

(10) Patent No.: US 6,466,927 B1
(45) Date of Patent: Oct. 15, 2002

(54) METHOD FOR CREATING A PROCESS CAPABILITY DATABASE

(75) Inventors: John J. Dougherty, Collegeville, PA (US); Thomas R. Campbell, Washington; Alan L. Arvidson, Burlington, both of CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/437,139

(22) Filed: Nov. 10, 1999

(51) Int. Cl.[7] .................................................. G06N 5/02
(52) U.S. Cl. .................... 706/45; 173/177; 205/82; 438/14
(58) Field of Search .......................... 706/45; 205/82; 173/177; 438/14; 702/180

(56) References Cited

U.S. PATENT DOCUMENTS 4,903,783 A * 2/1990 Rushanan et al. .......... 173/177
5,368,715 A * 11/1994 Hurley et al. ................ 205/82
6,184,048 B1 * 2/2001 Ramon ......................... 438/14

OTHER PUBLICATIONS

Hoehn, W.K., Robust designs through design to six sigma manufacturability, Engineering Management Conference, 1995. Global Engineering Management: Emerging Trends in the Asia Pacific., Proceedings of 1995 IEEE Annual International, 1995, pps.: 241–246.*

Fieler, P.E.; Loverro, N., Jr., Defects tail off with six–sigma manufacturing, IEEE Circuits and Devices Magazine, vol.: 7 Issue: 5, Sep. 1991, pps.: 18–20, 48.*

Tobias, P.A., A Six Sigma program implementation, Custom Integrated Circuits Conference, 1991., Proceedings of the IEEE 1991, May 12–15, 1991, pps.: 29.1/1–29.1.4.*

White, R.V., An introduction to Six Sigma with a design example, Applied Power Electronics Conference and Exposition, 1992. APEC '92. Conference Proceedings 1992., Seventh Annual, Feb. 23–27, 1992, pps.: 28–35.*

Smith, B., Six–sigma design (quality control), IEEE Spectrum, vol.: 30 Issue: 9, Sep. 1993, pps.: 43–47.*

* cited by examiner

Primary Examiner—Wilbert L. Starks, Jr.
(74) Attorney, Agent, or Firm—Karl Vick; Kevin Duncan; Hunton & Williams

(57) ABSTRACT

A procedure and method for eliciting expert information on process capability and thereafter manipulating the elicited information in such a manner that it can effectively be used in a process capability database that is operating in a six sigma regime. The manipulation preferably includes converting the expert elicited information from a tolerance-type metric to a short term standard deviation (or sigma) metric, whereby the result of the manipulation is used to populate directly a process capability database and, as appropriate, thereby augment, replace or modulate the data already stored therein.

32 Claims, 3 Drawing Sheets

| PROCESS | SUBPROCESSES | METHOD | MATERIAL | MAT'L DESCRIPTOR | FEATURE | RANGE | LIMITS |
|---|---|---|---|---|---|---|---|
| FABRICATED PARTS | | | | | | | |
| | STAMPING (~640 ITEMS) | | | | | | |
| | | SINGLE DIE | | | | | |
| | | | FERROUS | | | | |
| | | | | HARD | | | |
| | | | | | HOLE SIZE | <.25 | ±0.004 |
| | | | | SOFT | | | |
| | | | NON-FERROUS | | | | |
| | | | NON-METALLIC | | | | |
| | | SHORT RUN | | | | | |
| | | PROGRESSIVE | | | | | |
| | | FINE BLANK | | | | | |
| | PUNCHING | | | | | | |
| | BENDING | | | | | | |
| | SHEARING & 3 OTHERS | | | | | | |
| MOLDING | | | | | | | |
| MACHINING | | | | | | | |
| SURFACE FINISHING + 3 OTHER PROCESSES | | | | | | | |

FIG. 2

METHOD FOR CREATING A PROCESS CAPABILITY DATABASE

BACKGROUND OF THE INVENTION

This invention relates to creating and updating a process capability database including the collection of expert knowledge, which database is used by design engineers in the course of designing and manufacturing parts or features of parts that are quality controlled preferably using a six sigma quality control regime.

Process capability refers to the accuracy or tolerance by which a manufacturing process can fabricate parts or features of parts. Process capability information is crucial to the quality design of products that depend on these parts and features. Known procedures allow calculation of process capability via careful measurement of features manufactured by the process. This is a time consuming process which, when properly done, requires measurement over a number of potentially confounding variables such as time of day, day of week, shift, environment, etc. When a manufacturing firm develops a wide variety of products, a significant effort must be expended before quality design procedures can be employed.

In an effort to streamline process capability knowledge, there has been employed the use of "expert" knowledge to augment existing sources of information relating to process capability. For example, Zucherman (SME paper MS86-951, "A Knowledge Base Development for Producibility Analysis in Mechanical Design") describes the use of an expert system to analyze a design from a producibility standpoint. However, this document does not describe the acquisition of process capability data and/or any subsequent manipulation of that acquired data to properly populate a database used for assessing process capability.

U.S. Pat. No. 5,452,218 to Tucker et al. describes a system and method for determining quality analysis on fabrication and/or assembly design using shop capability data. In the scheme disclosed by Tucker et al., which is applicable to a six sigma quality model, there is an opportunity to consult with a process consultant with respect to information not found in a previously prepared database. However, except for noting that consultation can be effected via e-mail or electronic message, Tucker et al. do not address any details regarding the input of expert information into a database, or the desirability of any particular manipulation of the obtained information that is input, especially in view of a six sigma quality control approach.

SUMMARY OF THE INVENTION

It is therefore desirable to provide a procedure and method for eliciting expert opinion on process capability and thereafter manipulating the elicited information in such a manner that it can effectively be used to populate a process capability database, operating in a six sigma regime, that is accessed by at least design and process engineers. The manipulation preferably includes converting the expert elicited information from a tolerance-type metric to a short term standard deviation (or sigma) metric, whereby the result of the manipulation is used to populate directly a process capability database and, as appropriate, thereby augment, replace or modulate the data already stored therein.

With this method, the knowledge of experienced manufacturing and design engineers can rapidly fill a process capability database for a large number of parts and features across multiple processes. This provides not only a basis for quality design, but an initial benchmark for process improvement.

BRIEF DESCRIPTION OF THE DRAWINGS

FIG. 2 is one exemplary database schema in accordance with a preferred embodiment of the invention.

DETAILED DESCRIPTION OF THE INVENTION

In accordance with an embodiment of the present invention, there is provided a method by which a process capability database is populated with data that has been manipulated and/or assimilated in particular ways to permit efficient and meaningful use of that data in the overall database. Specifically, in a preferred embodiment of the invention, in addition to conventionally acquired data about particular manufacturing processes, expert opinion on process capability is elicited in the form of tolerance information. This tolerance information is thereafter converted into a short term sigma metric so that the data can effectively be incorporated into an overall process capability database predicated on a six sigma quality model.

Figure 1:
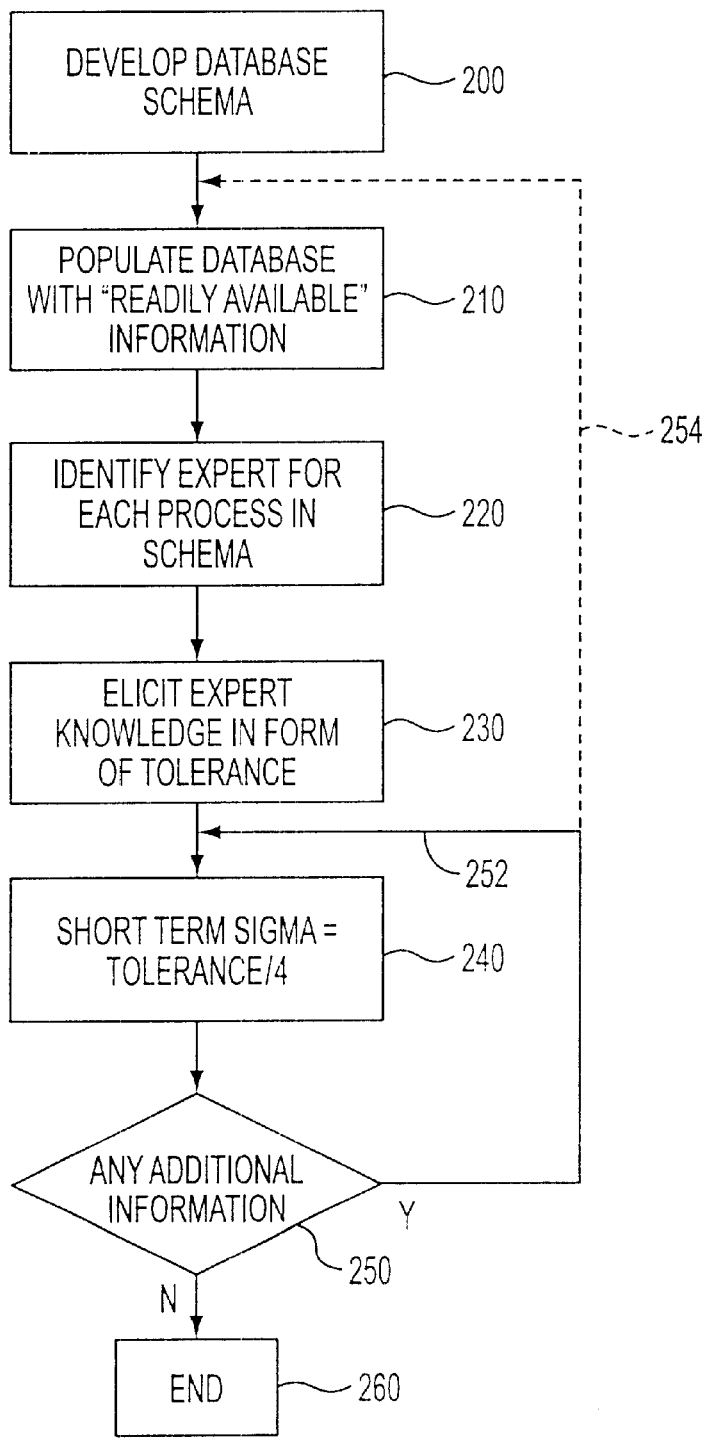
FIG. 1 is a schematic block diagram of process steps in accordance with a preferred embodiment of the present invention.

Referring now to FIG. 1, there is shown a plurality of steps in accordance with a preferred embodiment of the present invention. In step 200 a database schema is developed that will form the basis of a process capability database (not shown). FIG. 2 shows one possible database schema, with respect to mechanical manufacture, that can be used in the method depicted in FIG. 1. The schema of FIG. 2 is discussed below in detail.

As an example, preferably there are at least seven major processes that are susceptible to six sigma-type quality control and that are pertinent to the preferred embodiment:

Fabrication

Machining

Molding

Surface Finishing

Printing/Marking

Powder Metallurgy

Drawing/Extruding.

Each process preferably further is broken down logically as appropriate. Thus, under Fabrication the following categories are possible:

Subprocesses (Fabrication:stamping)

Various methods or implementations of subprocesses (Fabrication:stamping:single die)

Material (Fabrication:stamping:single die:ferrous)

Specific material type (Fabrication:stamping:single die:ferrous:hard)

Feature (Fabrication:stamping:single die:ferrous:hard:hole)

Feature range (Fabrication:stamping:single die:ferrous:hard:hole:diameter<0.25 in).

Figure 3:
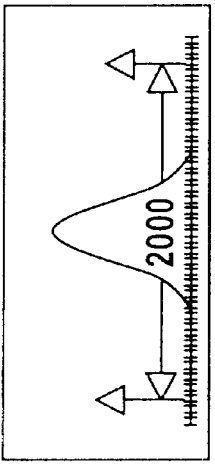
FIG. 3 is an exemplary graphical user interface for depicting a hierarchical structure for a database schema in accordance with a preferred embodiment.

These hierarchical levels are arranged such that they can be stored in the process capability database and displayed on a computer system accessible to design engineers, for example. An exemplary graphical user interface (GUI) for depicting the stored hierarchy and associated data is shown in FIG. 3. Any suitable database program running on a stand alone or networked computer can be implemented to run the process capability database and associated GUI.

In FIG. 3 there is shown, in addition to the data discussed herein regarding the process capability database, other elements relating to quality control predicated on a six sigma model. For example, the GUI preferably includes indications of an entitlement standard deviation, worst case/RSS (root sum of squares) limits, worst case/RSS limits—stretch (where "stretch" refers to a predetermined margin), future entitlement standard deviation and/or the underlying distribution type, e.g. normal, Gaussian.

Referring again to FIG. 1, after the database schema or structure is developed, the process capability database is populated in step 210. At this stage, the data used to populate the database is that which is considered to be readily available, such as data gleaned from engineering handbooks or manufacturer's specifications. On-line services, via the Internet, may also be used to gather the desired data. The data acquired and stored in step 210 provides a starting reference for experts, as will be discussed below.

At step 220, for each process in the database schema, a manufacturing or design engineer with working knowledge of the process and/or the quality of parts normally delivered by suppliers is identified. Then, at step 230, the expert is queried to elicit his/her particular knowledge with respect to specific processes. Specifically, it is in accordance with a preferred embodiment to elicit from the chosen experts what is considered to be "industry standard" tolerances. As noted above, the "readily available" data previously stored in the database preferably is used by the engineer or expert as a starting reference. From this starting reference the expert refines the data to conform more accurately with "true," or more practical or realistic, industry standards.

In the context of the preferred embodiment of the present invention, "industry standard" preferably means a tolerance limit which a wide range of competent global industrial manufacturers meet 99% of the time without special sorting. The standard represents the performance of most companies, not the few that have adopted and achieved six sigma quality levels, nor marginal manufacturers with poor performance. This tolerance level preferably represents what suppliers typically promise on a typical part from a controlled process. That is, the part is not one which has special tolerance requirements, sorting or undergoes extra operations. In a typical supplier lot, one expects the parts to pass a 0.65% AQL (Acceptance Quality Level), 90 out of 100 times. Preferably, an industry standard level that is placed in the database will not be proven by one example of a "best in class" supplier, or, likewise, rejected by experience with one low cost, low quality supplier.

Thus, returning to step 230 in FIG. 1, an expert is asked to provide tolerance information in response to questions about a typical manufacturer.

(a) for a particular process (e.g. stamping), (b) using a particular method (e.g. single die), (c) for a particular material (e.g. ferrous, hard), (d) in a particular range (e.g. <0.25"diameter), and /or (e) for a particular feature (e.g. hole).

The thus acquired knowledge (data) is in the form of tolerance information. However, such tolerance information is not immediately useful in a six sigma approach to quality control. That is, the tolerance information elicited from the experts must first be manipulated or assimilated to be in a form that can be used in the process capability database.

In the six sigma paradigm, standard industry practice results in short term process capability of 4 sigma ($4\sigma$). This means that a typical parts manufacturer, when quoting a tolerance of $\pm x$ around a mean value of y, delivers such parts with a normal process that has short term standard deviation of $x/4$. Traditional manufacturing has depended on incoming inspection and the use of operational curves to balance producer/consumer risk. These curves are based on the assumed underlying process capability of the producer. For example, common levels in use involve a sampling plan AQL (acceptance quality level) of 0.65% to 1%. This relates to a long term process capability (AQL levels tend to be applied to long term contracts and represent an ongoing expectation of quality) of 0.65% to 1% failures, or a long term process capability of $2.58\sigma$ to $2.72\sigma$, which relates to a short term sigma of $4\sigma$ to $4.2\sigma$.

In view of the above, at step 240, short term sigma is obtained by dividing the tolerance information provided by an expert by 4. The result of this division provides a short term sigma value that can effectively be used in the six sigma quality model.

The process in accordance with the preferred embodiment, however, does not necessarily end at this point. As the so-called "industry standard" might change, the preferred embodiment of the present invention also includes the flexibility to change accordingly. For example, the industry standard values are thereafter available, via the process capability database, for review by plant and sourcing personnel as well as any other internal company technology staff.

Additionally, the process capability database preferably is made available to selected suppliers for comment and feedback. Such sources, especially if they are working within the six sigma regime, provide an independent cross check of the data. Finally, yet another source of "industry standards" is from on-going literature and/or on-line searches. As designers and process owners canvass the published tolerances in manufacturing texts, handbooks, vendor literature and Internet websites, the data in the process capability database can be altered and/or updated as necessary.

The foregoing feedback or data review cycles are depicted in FIG. 1 by step 250. If additional information becomes available or pertinent then that information is converted to a short term sigma metric immediately, through branch 252, or alternatively, the information can again be used as a reference point for experts by passing through branch 254.

The end of the process, as depicted in FIG. 1, if in fact an "end" is desired as the method in accordance with the preferred embodiment preferably is open and responsive to changes in industry standards, is step 260. It is noted that the preferred method is applicable to any database schemas wherein expert knowledge is a desirable input and wherein the acquired expert knowledge may be converted to a metric that is more useful to the implemented quality control model.

While the present invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A method of populating a process capability database, comprising the steps of:
defining a plurality of categories for a predetermined process, each of said categories representing discrete acts or features of said process;
identifying information associated with at least one of said categories and populating said process capability database with the same;
acquiring expert knowledge related to at least one of said categories, said expert knowledge being in the form of a tolerance value;
converting the thus-acquired tolerance value to a short term sigma metric;
further populating said process capability database with said short term sigma metric; and
displaying said information and said short term sigma metric to a designer.

2. The method of claim 1, further comprising obtaining additional information in the form of tolerance values, converting said additional information to a short term sigma metric, and updating said process capability database with the same.

3. The method of claim 1, further comprising obtaining additional information in the form of tolerance values, eliciting additional expert knowledge based on said additional information, wherein said additional expert knowledge is in the form of a tolerance value, converting said additional expert knowledge to a short term sigma metric, and updating said process capability database with the same.

4. The method of claim 1, wherein said converting step comprises dividing said tolerance value by 4.

5. The method of claim 1, wherein said identifying step comprises accumulating information from at least one of engineering handbooks, literature and Internet services.

6. The method of claim 1, wherein said predetermined process comprises at least one of fabrication, machining, molding, surface finishing, printing/marking, powder metallurgy, and drawing/extruding.

7. The method of claim 1, wherein said categories comprise at least one of a subprocess, a method, material, range and feature.

8. The method of claim 1, wherein said predetermined process comprises manufacturing a part for a device.

9. The method of claim 1, further comprising iteratively updating said process capability database.

10. A method of populating a process capability database operating, at least in part, under a six sigma quality control model, comprising the steps of:
defining a plurality of categories for a predetermined process, each of said categories representing discrete acts or features of said process;
identifying readily available information associated with at least one of said categories and populating said process capability database with said readily available information;
eliciting expert knowledge related to at least one of said categories, said expert knowledge being elicited based, at least partially, on said readily available information, the thus-elicited expert knowledge being in the form of a tolerance value;
converting said tolerance value to a short term sigma metric by diving said tolerance value by 4;
further populating said process capability database with said short term sigma metric; and
displaying said information and said short term sigma metric to a designer.

11. The method of claim 10, further comprising iteratively updating said process capability database.

12. The method of claim 11, wherein said process capability database is updated with at least one of readily available knowledge and expert knowledge.

13. The method of claim 10, wherein said identifying step comprises accumulating information from at least one of engineering handbooks, literature and Internet services.

14. The method of claim 10, wherein said predetermined process comprises at least one of fabrication, machining, molding, surface finishing, printing/marking, powder metallurgy, and drawing/extruding.

15. The method of claim 10, wherein said categories comprise at least one of a subprocess, a method, material, range and feature.

16. The method of claim 10, wherein said predetermined process comprises manufacturing a part for a device.

17. A computer-readable storage medium, comprising:
instructions for defining a plurality of categories for a predetermined process, each of said categories representing discrete acts or features of said process;
instructions for identifying information associated with at least one of said categories and populating said process capability database with the same;
instructions for acquiring expert knowledge related to at least one of said categories, said expert knowledge being in the form of a tolerance value;
instructions for converting the thus-acquired tolerance value to a short term sigma metric;
instructions for further populating said process capability database with said short term sigma metric; and
instructions for displaying said information and said short term sigma metric to a designer.

18. The medium of claim 17, further comprising instructions for obtaining additional information in the form of tolerance values, converting said additional information to a short term sigma metric, and updating said process capability database with the same.

19. The medium of claim 17, further comprising instructions for obtaining additional information in the form of tolerance values, for eliciting additional expert knowledge based on said additional information, wherein said additional expert knowledge is in the form of a tolerance value, for converting said additional expert knowledge to a short term sigma metric, and for updating said process capability database with the same.

20. The medium of claim 17, wherein said instructions for converting comprise dividing said tolerance value by 4.

21. The medium of claim 20, wherein the instructions for identifying step comprise accumulating information from at least one of engineering handbooks, literature and Internet services.

22. The medium of claim 17, wherein said predetermined process comprises at least one of fabrication, machining, molding, surface finishing, printing/marking, powder metallurgy, and drawing/extruding.

23. The medium of claim 17, wherein said categories comprise at least one of a subprocess, a method, material, range and feature.

24. The medium of claim 17, wherein said predetermined process comprises manufacturing a part for a device.

25. The medium of claim 17, further comprising instructions for iteratively updating said process capability database.

26. A computer-readable storage medium encoded with machine-readable code for populating a process capability database operating, at least in part, under a six sigma quality control model, comprising the steps of:

instructions for defining a plurality of categories for a predetermined process, each of said categories representing discrete acts or features of said process;

instructions for identifying readily available information associated with at least one of said categories and populating said process capability database with said readily available information;

instructions for eliciting expert knowledge related to at least one of said categories, said expert knowledge being elicited based, at least partially, on said readily available information, the thus-elicited expert knowledge being in the form of a tolerance value; instructions for converting said tolerance value to a short term sigma metric by diving said tolerance value by 4;

instructions for further populating said process capability database with said short term sigma metric; and instructions for displaying said information and said short term sigma metric to a designer.

27. The medium of claim 26, further comprising instructions for iteratively updating said process capability database.

28. The medium of claim 27, wherein said process capability database is updated with at least one of readily available knowledge and expert knowledge.

29. The medium of claim 26, wherein said identifying step comprises accumulating information from at least one of engineering handbooks, literature and Internet services.

30. The medium of claim 26, wherein said predetermined process comprises at least one of fabrication, machining, molding, surface finishing, printing/marking, powder metallurgy, and drawing/extruding.

31. The medium of claim 26, wherein said categories comprise at least one of a subprocess, a method, material, range and feature.

32. The medium of claim 26, wherein said predetermined process comprises manufacturing a part for a device.

* * * * *